United States Patent [19]
Scheiwiller

[11] Patent Number: 4,941,301
[45] Date of Patent: Jul. 17, 1990

[54] ELEMENTS WITH OPENING

[76] Inventor: Rolf Scheiwiller, Buolterlistrass 9, CH-6052 Hergiswil, Switzerland

[21] Appl. No.: 412,546

[22] Filed: Sep. 25, 1989

Related U.S. Application Data

[63] Continuation of Ser. No. 120,628, Nov. 13, 1987, abandoned.

[51] Int. Cl.$^5$ ............................................. E02D 27/00
[52] U.S. Cl. ........................................ 52/102; 52/576
[56] References Cited

U.S. PATENT DOCUMENTS

| | | | |
|---|---|---|---|
| D. 287,884 | 1/1987 | Scheiwiller | D25/113 |
| 2,002,311 | 5/1935 | Corwin | 52/576 |
| 2,118,936 | 5/1938 | Malinovszky | 52/303 |
| 2,209,283 | 7/1940 | Ronzone | 52/314 |
| 2,301,672 | 11/1942 | Akam | 52/125.3 |
| 2,577,215 | 12/1951 | Smith et al. | 264/133 |
| 3,726,042 | 4/1973 | Haile | 47/34.12 |
| 4,597,236 | 7/1986 | Braxton | 52/564 |
| 4,627,764 | 12/1986 | Scheiwiller | 404/41 |

FOREIGN PATENT DOCUMENTS

| | | |
|---|---|---|
| 339944 | 11/1977 | Austria . |
| 0114263 | 12/1983 | European Pat. Off. . |
| 1534382 | 7/1970 | Fed. Rep. of Germany . |
| 7102691 | 1/1971 | Fed. Rep. of Germany . |
| 1584523 | 3/1973 | Fed. Rep. of Germany . |
| 7509034.5 | 3/1975 | Fed. Rep. of Germany . |
| 2519225 | 11/1976 | Fed. Rep. of Germany . |
| 7640808 | 12/1976 | Fed. Rep. of Germany . |
| 2701673 | 7/1978 | Fed. Rep. of Germany . |
| 7801963 | 11/1979 | Fed. Rep. of Germany . |
| 2900852 | 7/1980 | Fed. Rep. of Germany . |
| G8302622.3 | 6/1983 | Fed. Rep. of Germany . |
| 8309765.1 | 1/1984 | Fed. Rep. of Germany . |
| 598990 | 12/1925 | France . |
| 1350543 | 12/1963 | France . |
| 2277936 | 3/1976 | France . |
| 2376269 | 7/1978 | France . |
| 2550247 | 2/1985 | France . |
| 477661 | 1/1953 | Italy . |
| 608703 | 9/1960 | Italy . |

Primary Examiner—David A. Scherbel
Assistant Examiner—Creighton Smith
Attorney, Agent, or Firm—Marks Murase & White

[57] ABSTRACT

The elements with opening are preferably combined into a lawn plate with openings, whereby these elements with opening are impressed. The plate comprises in its longitudinal direction an indentation whereby a bulge is provided on one side and a narrowing on the other side with a width corresponding to that of an element with opening, and of the paving stone.

The individual elements with openings are compatible with paving stones so that these paving stones can be seamlessly adjoined to the element with an opening. When the elements are laid without adjoining paving stones, the plates interlock to provide a pleasant configuration. The arrangement of the individual elements with openings have different dimensions vary within large limits.

In another embodiment, the element with an opening is in two parts connected together by a traverse having a smaller thickness. The two lower, lateral edges of the lower part form part of a sector and a distance piece is provided at the upper edge on both sides of the upper part, the outer edges of this distance piece enclosing the same angle than the lower, lateral edges. These elements with opening can be laid in a straight configuration or in a circle around a tree.

12 Claims, 8 Drawing Sheets

ELEMENTS WITH OPENING

This application is a continuation, of application Ser. No. 07/120,628, filed 11/13/87 now abandoned.

BACKGROUND OF THE INVENTION

A number of lawn elements with openings are known which are either placed individually or which are formed into plates which are placed as units. These known lawn elements with opening are generally rectangular elements provided with a rectangular opening and the individual elements, as well as the plates produced from them, comprise generally straight edges. Due to their simple form, these lawn elements with openings are rarely used because they are not capable of satisfying certain requirements with respect to configuration. If normal pavement has to be placed adjacent to such lawn elements with openings, problems in construction and appearance as soon as the individual paving stones take on a complicated form.

For example, the German Utility Model No. 7,102,691 discloses an interconnecting stone for the lawn, wherein it is described that this stone can also be utilized together with other interconnecting stones. However, this stone consists of several rows connected together by frames, having interconnecting recesses and teeth at its longitudinal sides, whereby the rows consist of humps, between which earth and grass seed may be put. One of the characteristics of this stone is that its longitudinal borders go through the humps. These stones simply constitute rows of humps, and need particular other stones for extending the pavement beyond lawn stones.

SUMMARY OF THE INVENTION

Consequently, it is an object of the present invention to realize elements with openings, or a plate produced from them which on the one hand offer a wide scope of aesthetic configurations and on the other hand full compatibility with paving stones.

A similar problem arises with elements having openings which are intended to be placed around trees. Known elements with openings for trees are generally of simple form which are not compatible with normal paving stones nor with lawn stones with openings if these stones do not have a simple geometrical structure. Consequently, it is a further object of the present invention to realize an element with an opening intended to be placed around the trees which, beside having an aesthetic, pleasant form, is compatible with other paving and lawn stones with openings and which can be easily arranged in a circular configuration. The first problem is solved in that the lawn element with an opening has a size and a form corresponding to a paving stone having a corresponding size and which can be placed together with the former for providing a pavement in which the stones merge into one another. The second problem is solved in that the element with an opening is essentially sector-shaped and is comprised of two parts connected by a traverse, the lower, narrower part having two lateral edges which form part of the circular sector.

The invention will be further described by means of a drawing of examples of execution.

BRIEF DESCRIPTION OF THE DRAWINGS

The invention will be further understood by reference to the following drawings in which.

DETAILED DESCRIPTION OF THE INVENTION

Figure 1:
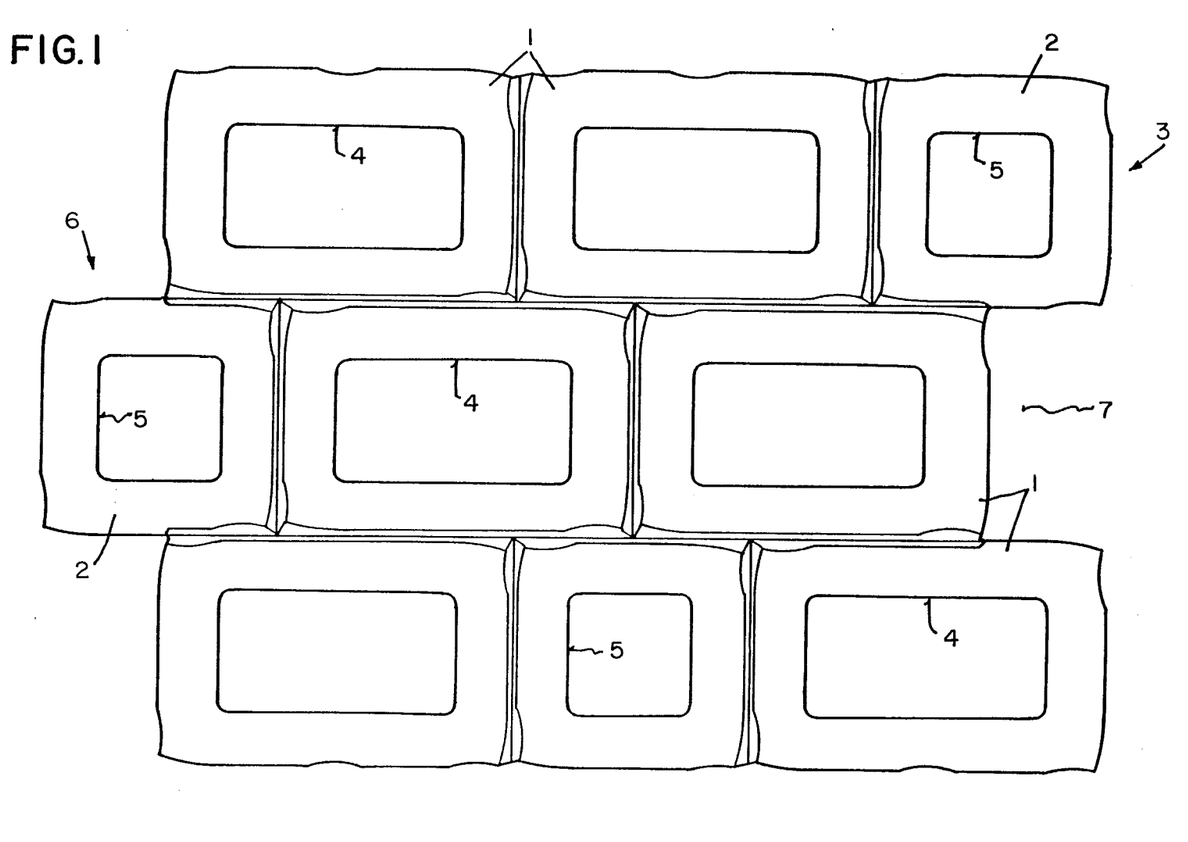
FIG. 1 shows a plate formed by lawn elements with openings.
Figure 2:
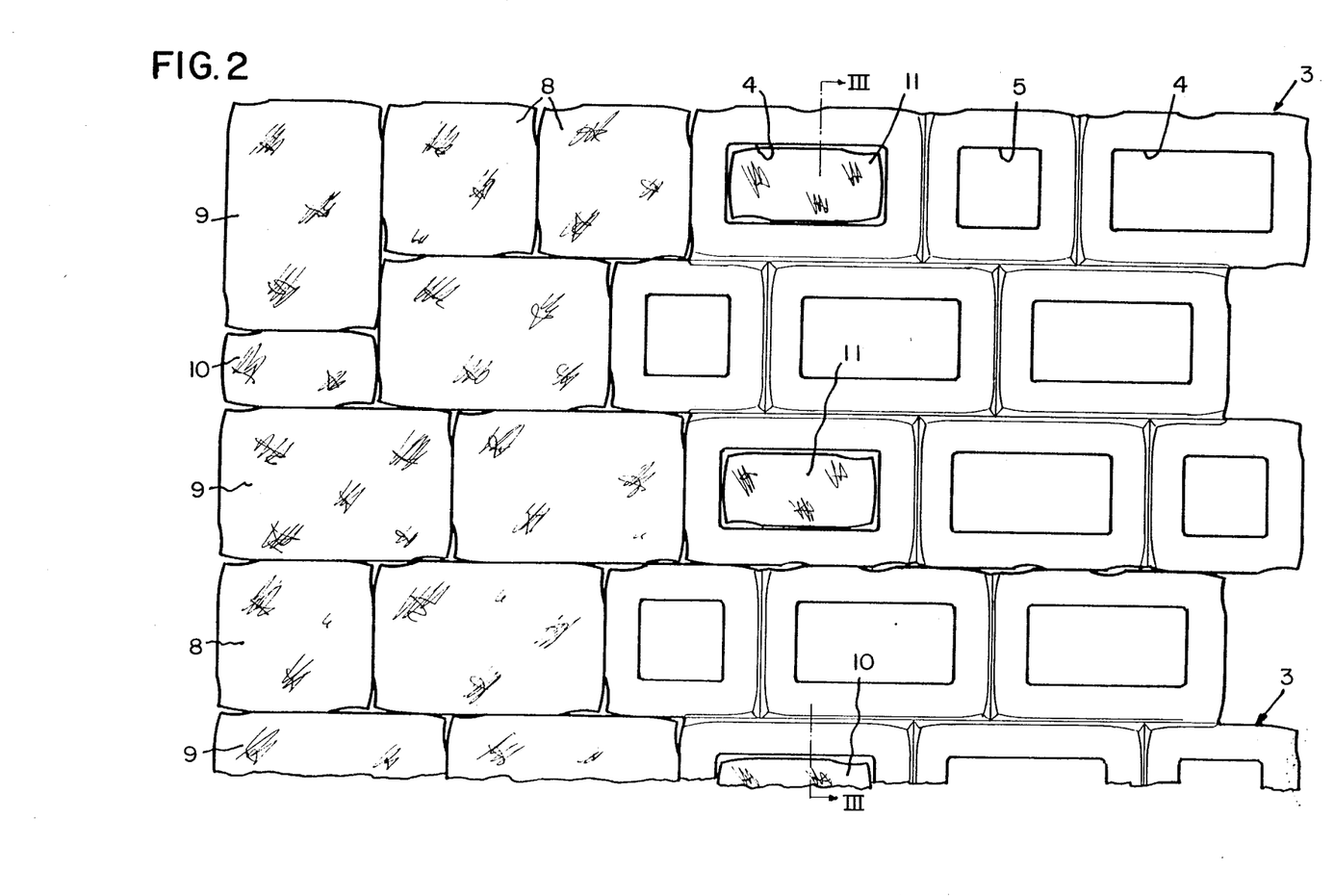
FIG. 2 shows a pavement formed by plates according to FIG. 1 and paving stones.
Figure 3:
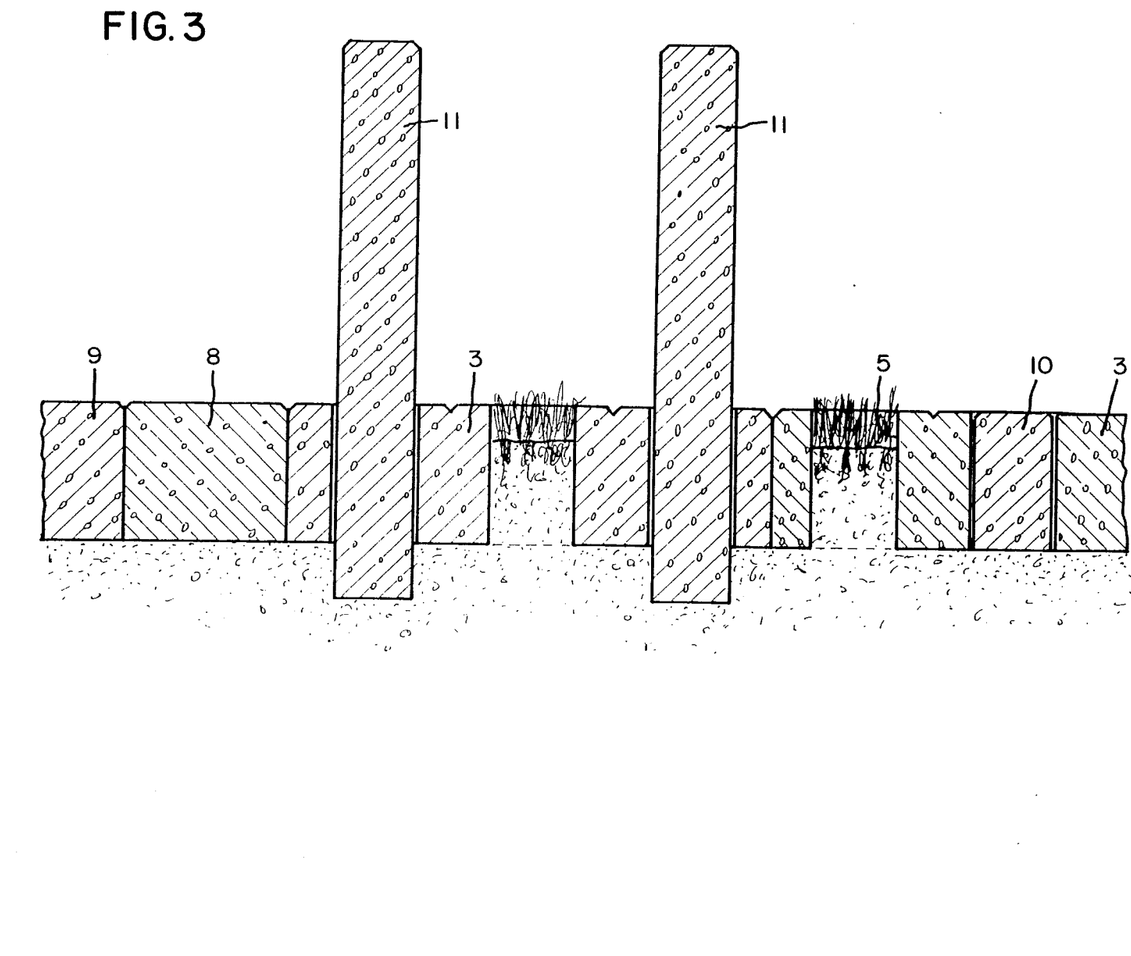
FIG. 3 shows a section along the line III—III of FIG. 2.

FIG. 1 shows a lawn plate with openings 3 formed of one and a half lawn elements with openings 1 and entire lawn elements with openings 2. In this example of execution, the individual lawn elements with opening are impressed on the plate. The outer contours of the one and a half lawn stones with openings or of the entire lawn stone with an opening corresponding to those of the paving stones which are shown in U.S. Pat. No. 287,884. As will be seen more clearly later on, it is not a question of the specific outer form of the lawn element with opening but rather that the outer form of the lawn element with opening coincides with the one of the adjacent paving stones. In this case, the internal openings 4 and 5 are rectangular and square, respectively, they can be obviously of any other form. However, it is preferably that the internal openings be as great as possible for achieving maximum turfing. The lawn plate with openings 3 comprises a toothing in the longitudinal direction, whereby a row of lawn elements with openings is offset in the longitudinal direction by one half of a normal lawn stone in order to form a projecting part 6 and a void 7. On both sides of the projecting part 6 or in the voids, it is possible to arrange further lawn plates with openings or full paving stones as shown in FIG. 2. In the left part of FIG. 2 are arranged full paving stones - full stones 8, one and a half stones 9 and half stones 10 - and towards the bottom lawn plates with openings. From FIG. 2, it can be seen further that the opening 4 at the one and a half stone element is slightly greater than a half stone 10, so that such a stone can be inserted in the former in order to mark parking places or, as shown in FIG. 3, for having a palissade element 11 with the same outer form as the half stone 10 to be arranged in the openings. FIG. 3 shows that these palissade elements can be anchored in the earth. Such palissade elements are well suited as borders for parking places or for other markings which one desires to emphasize. Due to the fact that such palissade elements are relatively slim, they can break easily if a car collides with them so that severe damage is avoided. FIG. 3 illustrates how normal paving stones can be added to the lawn plates with openings, the transition being seamless.

Figure 4:
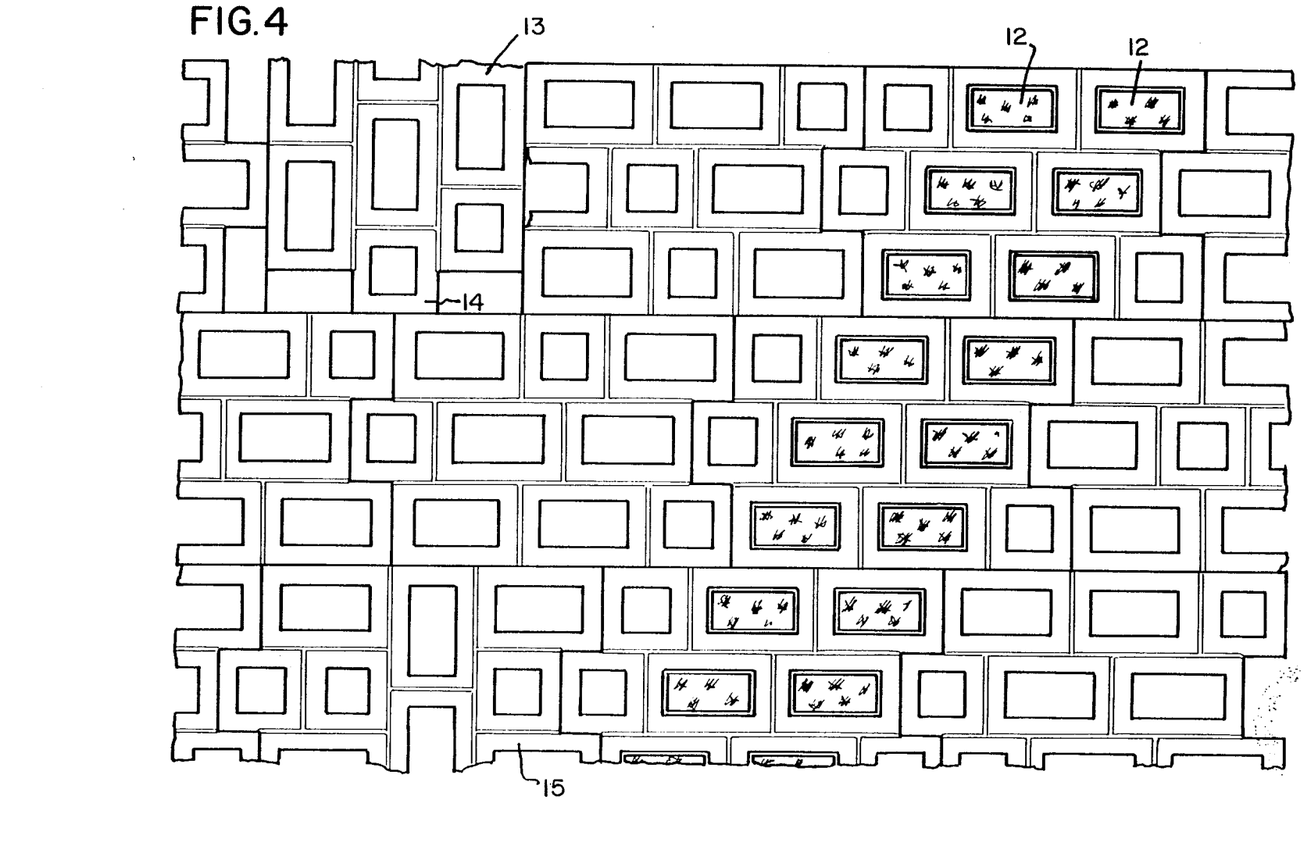
FIG. 4 shows a second example of execution of plates comprising lawn elements with openings.

FIG. 4 shows schematically different possibilities of arrangements and variants of execution. The lawn elements with openings as well as the related paving stones can be of simple, rectangular structure, as illustrated, or they may have the same form as illustrated in FIGS. 1 to 3 or any other form. In the right half of the drawing are lawn plates with, openings which correspond to those of FIG. 1 or 2, showing how the openings of the lawn elements can be filled e.g. stripwise by means of half stones in order to mark parking places. The half stones 12 can have a colour different from the color of the lawn stones with opening or they may have a greater height than the lawn element with opening. Correspondingly paving stones can be added to these lawn plates with openings. Different possibilities of variations are illustrated on the left side in FIG. 4. The upper part of the left side shows how the lawn plate 13 is arranged perpendicularly with respect to the other plates and how this plate is connected to the other without using the toothing, whereby openings for the lawn are created on both sides of the projecting part 14. Moreover, it follows from this plate that the lawn elements and their partition on the plate can be choosen at will and that is must not look as illustrated in FIG. 1. Also for the plate 15 illustrated in the bottom of the left side in FIG. 4, the partition of the lawn elements is different from the partition of the plates illustrated previously all plates comprise a toothing and all openings are closed toward the outside.

Figure 5:
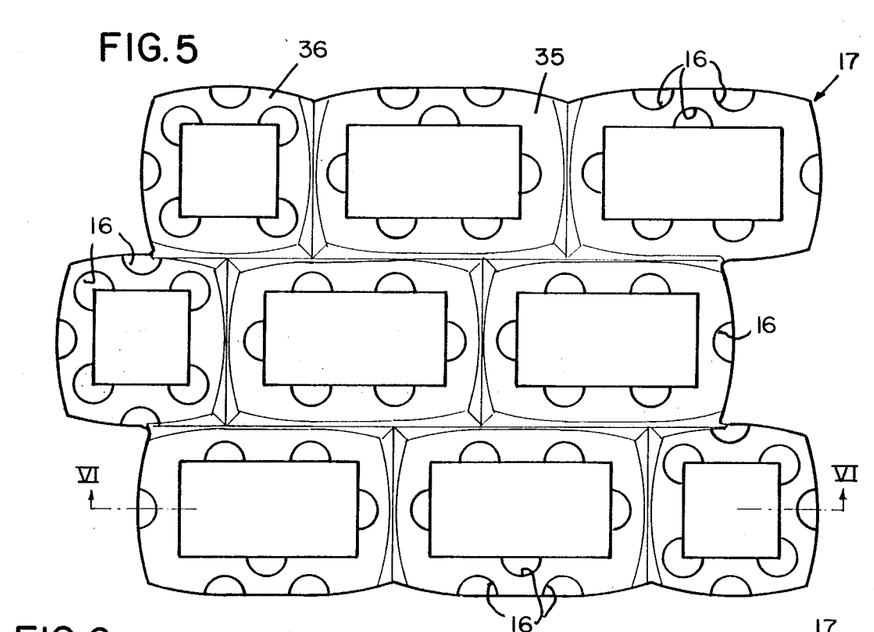
FIG. 5 shows a further example of execution of a plate formed by lawn elements with openings.
Figure 6:
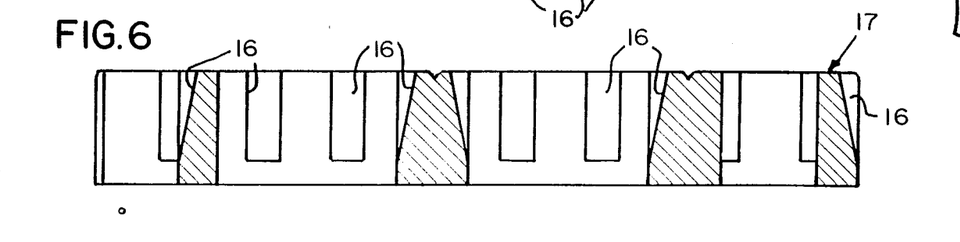
FIG. 6 shows a section along the line VI—VI of FIG. 5.
Figure 7:
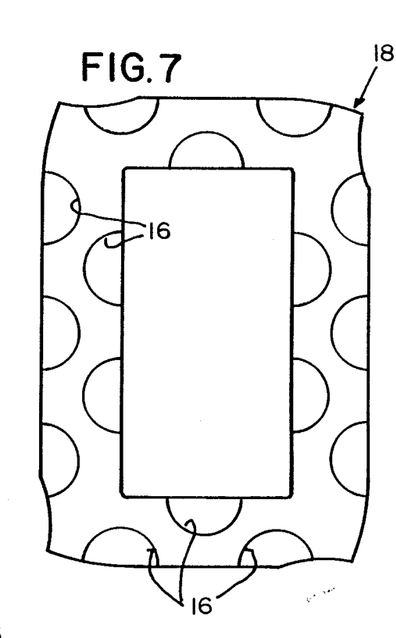
FIG. 7 shows a variation of the embodiment shown in FIG. 5 with a magnified scale.

FIGS. 5 to 7 illustrate another example of execution of a lawn element with an opening, and a lawn plate with openings. An object of a lawn stone with an opening is to provide for as great a green surface as possible. On the other hand, it is clear that the lawn stone must have sufficiently great stability because it is normally passed over by vehicles, possibly also by heavy freight cars. In the examples of execution according to FIGS. 5 to 7, indentations 16 are provided at the outer edge as well as at the inner side, these indentations not passing entirely through the stone, but diminishing in dimension towards the bottom. This permits achievement of a greater surface for growing in of grass, while the stability of such a plate or element is reduced only slightly. FIG. 5 shows also another outer form of a lawn element with an opening, and a lawn plate with openings 17 different from the preceding examples, whereby the outer form corresponds to a known paving stone already existing on the market, whereby these paving stones can be added to such lawn plates with openings, the transition being seamless.

In FIG. 7 further illustrates that individual lawn elements with opening can also be used, these elements corresponding e.g. to the one and a half stone of the corresponding paving stone. While one prefers lawn plates with openings for greater areas and also because of the stability, individual lawn stones with openings 18 are advantageous where smaller areas have to be paved or a better adaptation to the ground is desired. The individual stones 18 can be also provided with indentations 16.

Figure 8:
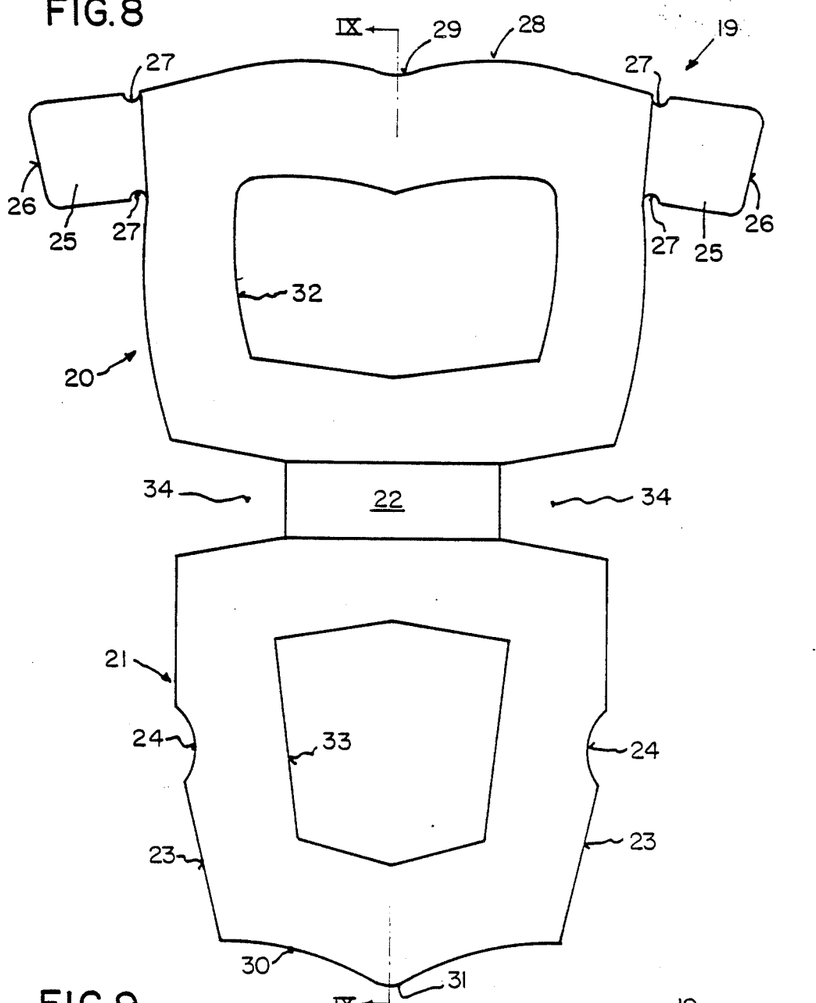
FIG. 8 shows an element with an opening which can be placed in a lawn as well as under trees.
Figure 9:
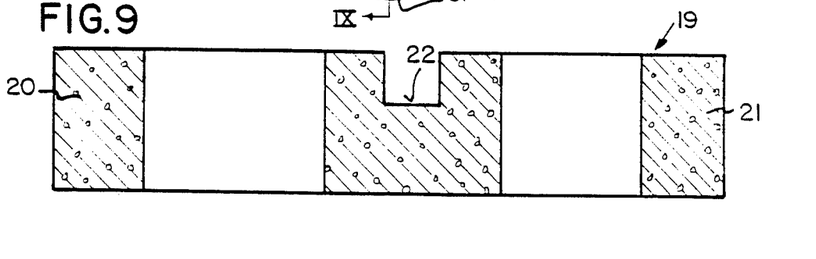
FIG. 9 shows a section along the line IX—IX of FIG. 8, with a reduced scale.
Figure 10:
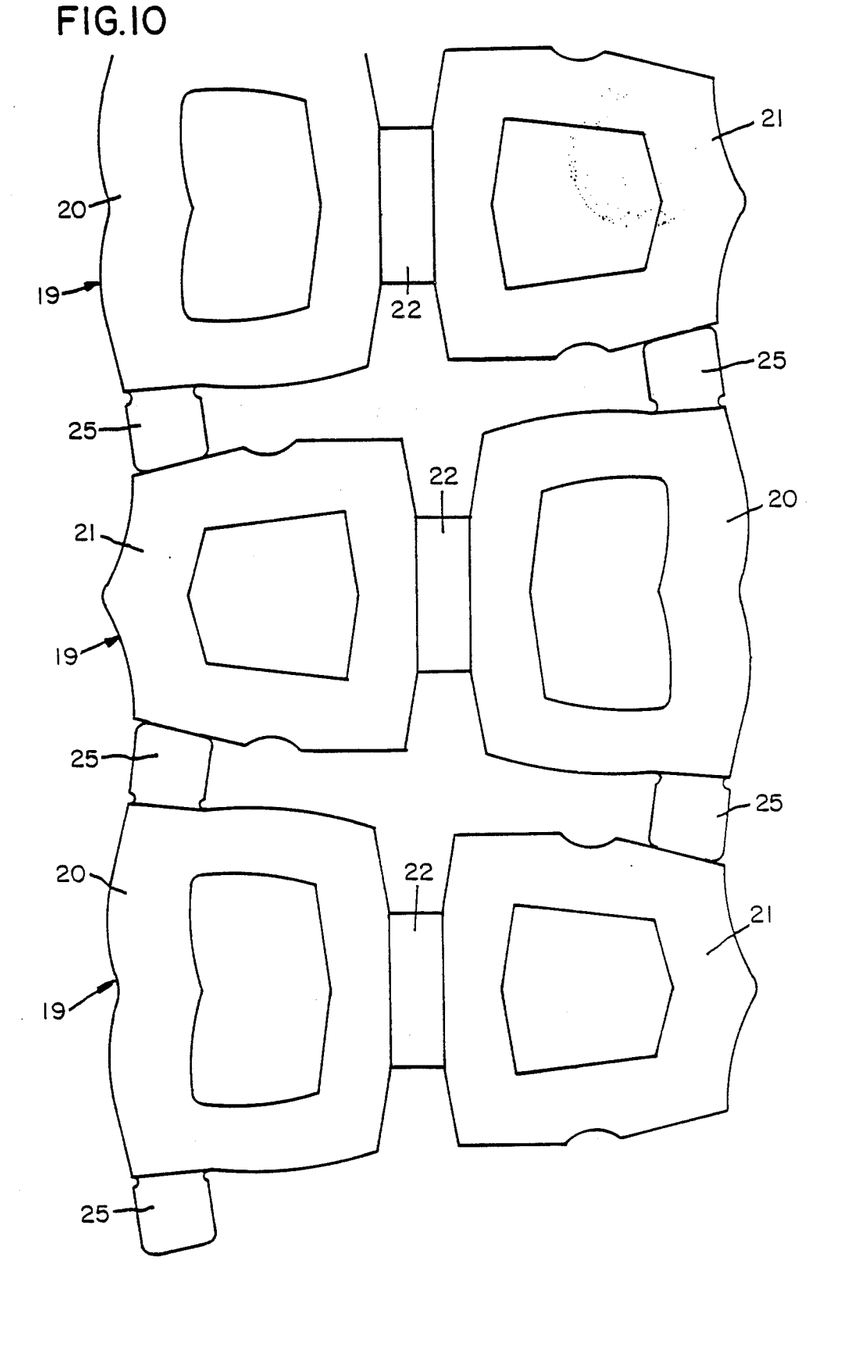
FIG. 10 shows an example of a configuration realized with elements according to FIG. 8.
Figure 11:
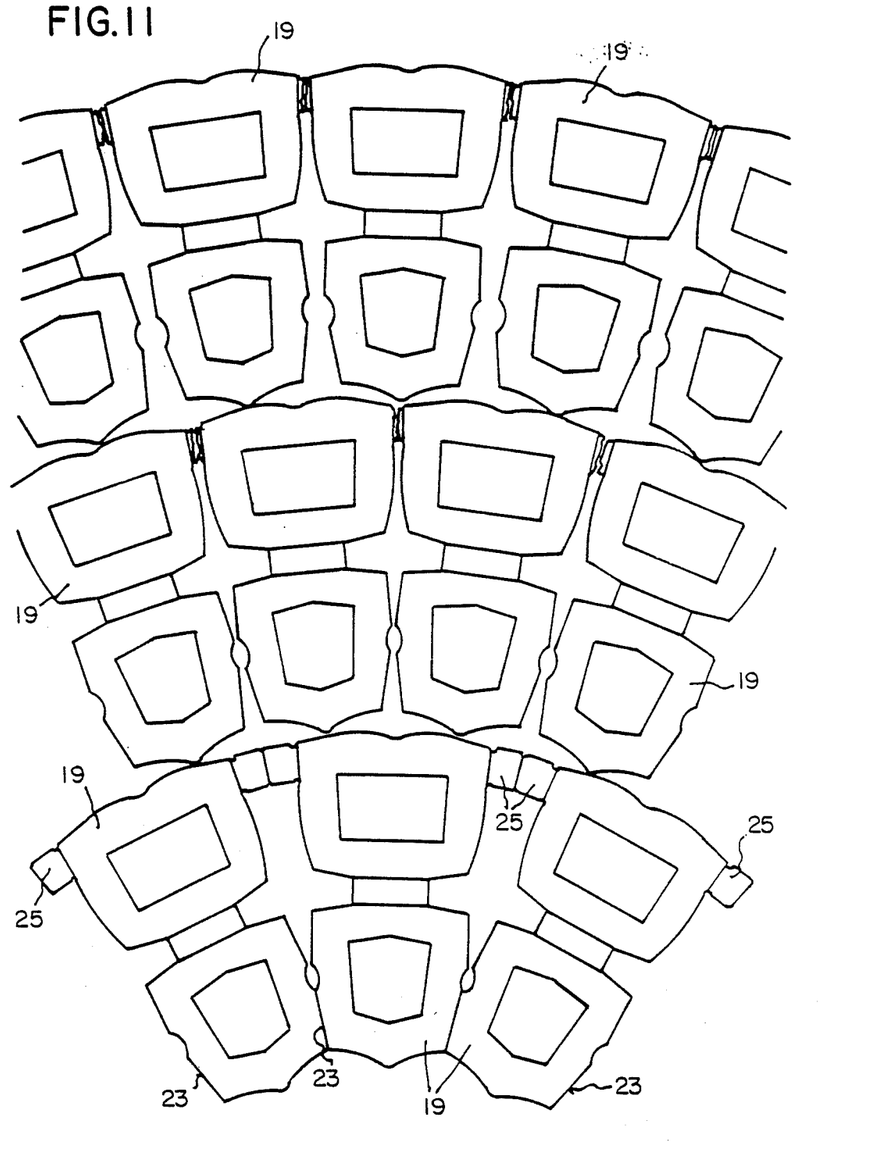
FIG. 11 shows a pattern of the elements of FIG. 8 arranged around a tree.

FIG. 8 shows a stone with opening which can be used as a lawn stone which, in accordance with FIG. 10, can be laid on great surfaces or, in accordance with FIG. 11, which can be used as a stone to be laid around a tree. The sector shaped element with an opening illustrated in FIG. 8 comprises an upper part 20 and a lower, smaller part 21, both parts being connected together by a traverse 22. As shown in FIG. 9, the tranverse 22 does not have the same thickness as the parts 20 and 21 in order to allow for a covering with grass. The lower part 21, seen as a whole, has a shape the width of which decreases towards the bottom. For using such an element around a tree, it is advantageous that at least a part of it is in form of a sector in order to facilitate the placing of such elements around a tree. In the present case of FIG. 8, both lower, lateral edges 23 of the lower part 21 form part of a sector with an angle of aperture of e.g. 24° to 30° or, as in the present example, of 27.6°. This value of 27.6° has been choosen in order to form a circle of a diameter of 42 cm with a stone having a height of about 30 cm, a number of 13 of such elements being used in a full circle as shown in FIG. 11. The tapering towards the top on both sides of the upper portion of the lower part 21 as well as the recesses 24 on both sides serve to reduce the surface area of the stone, and to increase the surface for eath or lawn. This upper portion can be arbitrarily shaped. The illustrated form of the upper part 20 fulfills only an aesthetic function and is of no great importance. Distance pieces 25 are connected on both sides of the upper edge of the upper part 20, the outer edges 26 of these distance pieces having the same conicity than the lower edges 23 of the lower part 21 and their thickness corresponding to the one of the traverse 22. This permits, as shown in FIG. 11, the placement of the internal circle of elements around a tree, such that these elements adjoin each other. A reduction of the section 27 is provided between the distance pieces and the upper part 20 in order to facilitate the knocking off of these distance pieces if required. The upper edge 28 of the upper part 20 is curved and it comprises a narrowing 29, the lower edge 30 of the lower part 21 being also curved and comprising a bulge 31. The curved edges provide for a pleasant configuration and they increase the share of earth, of lawn, and they provide also a certain indentation in the transverse direction as partly shown in FIG. 11. Both openings 32, and 33 can be of any form but it is advantageous that the opening share is as great as possible. It is possible to realize at least the upper opening 32 such that it is adapted to receive a half stone element.

FIG. 10 shows how the elements with opening can be placed as lawn elements, whereby the stones are alternatively directed towards the top and towards the bottom, this permitting an arrangement having a straight configuration. However, because of the curved outer edges of the stones, it as also possible to place the stones on an arc or circle shaped configuration.

A surface covered with such stones with opening has a higher turfing share than a surface covered with lawn plates as illustrated in FIG. 1. On the other hand, the wall thickness of the element with opening 19 is smaller so that it cannot sustain a charge as great as in the case of the lawn plates according to FIG. 1.

As already mentioned, FIG. 11 shows a portion of a pattern placed around a tree and it is shown how it is possible to arrange the elements with opening 19 in concentric circles. It can be seen from FIG. 11 that for second and the further circles, the distance pieces 25 must be knocked off. However, it is also obviously possible to produce elements with opening which do not comprise distance pieces. For an opening of 42 cm in diameter, one requires 13 stones for the first circle and 26 stones for the second concentric circle and 39 stones for the third concentric circle, provided these stones with opening have a height of 30 cm and an upper width of about 18 cm when the distance pieces are knocked off. It is clear that any other dimensions can be utilized. It is also possible, starting from concentric circles, to place the stones in accordance with FIG. 10 and to proceed further in a straight or in a curved configuration. It is also possible, within the inventive idea, to form the upper edge in accordance with a known paving stone in order to continue the pavement. It is also visible from FIG. 10 that the elements with opening can be offset by one piece, whereby the distance pieces together with the recesses form an indentation 34.

Moreover, in this case, at least a part of the outer contour has a form corresponding to a set of paving stones order to ensure a seamless transition. For this reason, the recesses 34 on both sides have a shape which accepts a half paving stone 10.

I claim:

1. A substantially sector-shaped lawn element comprising:
   an upper part having an interior opening, a bottom portion and a longitudinal axis,
   a lower part smaller than said upper part, said lower part having an interior opening, a top portion, lateral sides and a longitudinal axis coinciding with the longitudinal axis of said upper part, the lateral sides lying along planes forming a sector, and
   a traverse connecting the bottom portion of said upper part with the top portion of said lower part,
   said lawn element adapted to be joined with paving stones of corresponding shape and dimension in a seamless transition.

2. A lawn element according to claim 1, wherein said upper part, said lower part and said traverse each have a thicknesses, the thickness of said traverse being smaller than the thicknesses of said upper and lower parts.

3. A lawn element according to claim 1 or claim 2, wherein the lateral sides of said lower part enclose an angle of at least 24°.

4. A lawn element according to claim 1 or 2, wherein the lateral sides of said lower part enclose an angle no greater than 30°.

5. A lawn element according to claim 1, wherein said upper part has lateral sides.

6. A lawn element according to claim 5, wherein distance pieces are attached to the lateral sides of said upper part, said distance pieces having outer sides which lie substantially on the planes forming the sector.

7. A lawn element according to claim 6, wherein said distance pieces have a thickness which is substantially similar to the thickness of said traverse.

8. A lawn element according to claim 6, wherein the distance pieces have inner sides and a neck which connects the inner sides of said distance pieces with the lateral sides of said upper part.

9. A lawn element according to claim 1, wherein said upper part has a top side which is curved inwardly.

10. A lawn element according to claim 1, wherein said lower part has a bottom side which is curved outwardly.

11. A lawn element according to claim 1, where said lower part has indentations on its lateral sides.

12. A plurality of substantially sector-shaped lawn elements, each comprising:
    an upper part having an interior opening, lateral sides, a bottom portion, distance pieces attached to the lateral sides and a longitudinal axis;
    a lower part smaller than said supper part, said lower part having an interior opening, a top portion, lateral sides and a longitudinal axis coinciding with the longitudinal axis of said upper part, the lateral sides lying along planes forming a sector; and
    a traverse connecting the bottom portion of said upper part with the top portion of said lower part;
    whereby said lawn elements are adapted to be positioned in a concentric manner around a center, so that at locations near the center, said lower parts of said lawn elements and the distance pieces are substantially adjacent to one another, and at locations distant from the center, said upper parts of said lawn elements are substantially adjacent to each other.

* * * * *